(12) United States Patent
Ono et al.

(10) Patent No.: US 12,220,812 B2
(45) Date of Patent: Feb. 11, 2025

(54) ROBOT DEVICE

(71) Applicant: KAWASAKI JUKOGYO KABUSHIKI KAISHA, Kobe (JP)

(72) Inventors: Shigeki Ono, Kobe (JP); Ryo Taniuchi, Kobe (JP); Shunsuke Wakimitsu, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 120 days.

(21) Appl. No.: 17/428,713

(22) PCT Filed: Apr. 3, 2020

(86) PCT No.: PCT/JP2020/015372
§ 371 (c)(1),
(2) Date: Aug. 5, 2021

(87) PCT Pub. No.: WO2020/209204
PCT Pub. Date: Oct. 15, 2020

(65) Prior Publication Data
US 2022/0126458 A1      Apr. 28, 2022

(30) Foreign Application Priority Data
Apr. 8, 2019   (JP) .................................. 2019-073246

(51) Int. Cl.
*B25J 19/00*       (2006.01)
*B25J 9/06*        (2006.01)
(Continued)

(52) U.S. Cl.
CPC ............. *B25J 17/0283* (2013.01); *B25J 9/06* (2013.01); *B25J 17/0258* (2013.01);
(Continued)

(58) Field of Classification Search
CPC ............ B25J 9/06; B25J 9/0009; B25J 9/106; B25J 9/12; B25J 9/0025; B25J 17/0258; B25J 17/0283
See application file for complete search history.

(56) References Cited

U.S. PATENT DOCUMENTS 4,973,215 A    11/1990   Karlen et al.
6,178,842 B1    1/2001   Murata et al.
(Continued)

FOREIGN PATENT DOCUMENTS

JP    S62-193789 A    8/1987
JP    H07-680 U       1/1995
(Continued)

*Primary Examiner* — Bobby Rushing, Jr.
(74) *Attorney, Agent, or Firm* — Oliff PLC (57) ABSTRACT

A robot device includes a first link configured to rotate on a first axis, a second link supported by a tip-end part of the first link so as to be rotatable on a second axis, and a hand part supported by a tip-end part of the second link. When one direction perpendicular to the first axis is a first perpendicular direction, and a direction perpendicular to both the first axis and the first perpendicular direction is a second perpendicular direction, the second axis extends in parallel to the first perpendicular direction and is deviated from the first axis in the second perpendicular direction.

17 Claims, 5 Drawing Sheets

(51) Int. Cl.
*B25J 17/02* (2006.01)
*B25J 9/00* (2006.01)
*B25J 9/12* (2006.01)

(52) U.S. Cl.
CPC ............... *B25J 9/0009* (2013.01); *B25J 9/12* (2013.01); *B25J 19/0025* (2013.01)

(56) References Cited

U.S. PATENT DOCUMENTS

| | | |
|---|---|---|
| 10,414,044 B2 * | 9/2019 | Motomura ............. B25J 9/0009 |
| 2004/0261562 A1 | 12/2004 | Haniya et al. |
| 2012/0011956 A1 | 1/2012 | Lundberg |
| 2017/0291297 A1 * | 10/2017 | Miyasaka ................ B25J 9/047 |
| 2018/0311834 A1 | 11/2018 | Ichibangase et al. |
| 2019/0047155 A1 | 2/2019 | Okuyama et al. |

FOREIGN PATENT DOCUMENTS

| | | | |
|---|---|---|---|
| JP | H11-216692 A | | 8/1999 |
| JP | 2003-200376 A | | 7/2003 |
| JP | 2018164959 A | * | 10/2018 |
| JP | 2018-183843 A | | 11/2018 |
| JP | 2019-034398 A | | 3/2019 |
| KR | 10-2014-0029152 A | | 3/2014 |
| WO | 2018/062070 A1 | | 4/2018 |

* cited by examiner

ROBOT DEVICE

CROSS-REFERENCE TO RELATED APPLICATIONS

This application is a National Phase application of International Application No. PCT/JP2020/015372, filed Apr. 3, 2020, which claims priority to Japanese patent Application No. 2019-073246 filed Apr. 8, 2019. The disclosure of the prior applications is hereby incorporated by reference herein in their entirety.

TECHNICAL FIELD

The present disclosure relates to a robot device.

BACKGROUND ART

Patent Document 1 discloses a 7-axis robot, which includes a pedestal, a base part, a lower arm, an upper arm, a first arm, a second arm, and a wrist part. The first arm is supported by a tip-end part of the upper arm so as to be rotatable on a first axis. The second arm is supported by a tip-end part of the first arm so as to be swingable on a second axis. The wrist part is provided to a tip-end part of the second arm, and an end effector is attached to the wrist part.

Patent Document 1 illustrates a sealant application inside a box-shaped workpiece, for example of a work which is automated by the 7-axis robot. In this example, the pedestal is installed outside the workpiece. The upper arm and the lower arm extend upwardly from the base part on the pedestal, and a tip end of the upper arm is located above an upper edge of the workpiece. The first arm extends substantially horizontally from the upper arm, and a tip end of the first arm is located within an inside area of the workpiece in the plan view. The second arm extends downwardly from the first arm, and takes a posture in which it is bent with respect to the first arm. The wrist part is located inside the workpiece, and the end effector opposes to a part to which the sealant is applied.

REFERENCE DOCUMENT OF CONVENTIONAL ART

Patent Document

[Patent Document 1] JP2018-183843A

DESCRIPTION OF THE DISCLOSURE

Problem to be Solved by the Disclosure

In the robot described above, the second axis is perpendicular to the first axis. When performing the illustrated work, there is room for an improvement in order to expand a movable range of the wrist part and the end effector.

One purpose of the present disclosure is to provide a robot device which can expand a movable range.

SUMMARY OF THE DISCLOSURE

A robot device according to the present disclosure includes a first link configured to rotate on a first axis, a second link supported by a tip-end part of the first link so as to be rotatable on a second axis, and a hand part supported by a tip-end part of the second link. One direction perpendicular to the first axis is a first perpendicular direction, and a direction perpendicular to both the first axis and the first perpendicular direction is a second perpendicular direction. The second axis extends in parallel to the first perpendicular direction, and is deviated from the first axis in the second perpendicular direction.

Here, a posture of the second link extending in parallel to the first axis is referred to as "a reference posture of the second link," a rotating direction when the second link rotates from the reference posture so that a tip end of the second link is oriented to a deviating side of the second axis is referred to as a "first rotating direction," and a rotating direction when the second link rotates from the reference posture so that the tip end of the second link is oriented to the opposite side from the deviating side of the second axis is referred to as a "second rotating direction."

According to this configuration, the second axis is located in a twisted position to the first axis. The second axis extends in parallel with the first perpendicular direction, does not intersect with the first axis, and is deviated from the first axis in the second perpendicular direction. Comparing with a case where the second axis intersects with the first axis perpendicularly, when the second link rotates in the first rotating direction, a movable range of the second link (the range in which the second link can rotate on the second axis without interfering with any member of the robot device, such as the first link) becomes larger than the comparative example. Accompanying this, a movable range of the hand part also expands and the workability improves When performing the illustrated work, for example, first a rotating angle of the first axis may be set so that the second axis deviates downwardly from the first axis, then the second link may be rotated on the second axis so that the tip end of the second link is oriented downward (the deviating side of the second axis). The movable range of the second link expands and the workability improves.

Note that, an amount of deviation of the second axis from the first axis may be set as a distance or dimension which exceeds a range of manufacturing error. Within the error range, the second axis may deviate from the first axis as long as the second axis does not intersect with the first axis.

A line space where a supply line configured to supply electricity and/or material is disposed may be provided to the first link and the second link. The line space may include a first insertion hole formed in a central part of the first link and opening in the tip-end part of the first link, a second insertion hole formed in a central part of the second link and opening in a base-end part of the second link, and a gap space formed between a tip-end opening of the first insertion hole and a base-end opening of the second insertion hole. In a reference posture of the second link, the center of the base-end opening of the second insertion hole may be deviated in the second perpendicular direction from the center of the tip-end opening of the first insertion hole.

According to this configuration, the supply line bends in the gap space following to the rotation of the second link while changing its curvature. Comparing with a case where the center of the tip-end opening and the center of the base-end opening are on the first axis in the reference posture of the second link, when the second link rotates in the first rotating direction from the reference posture, the distance from the tip-end opening to the base-end opening becomes longer than the comparative example. According to this, the curvature of the supply line in the gap space becomes smaller than the comparative example. Therefore, when the second link rotates in the first rotating direction, the supply line can be protected.

Effect of the Disclosure

According to the present disclosure, a robot device which can expand a movable range can be provided.

MODE FOR CARRYING OUT THE DISCLOSURE

Hereinafter, one embodiment is described with reference to the drawings.

Figure 1:
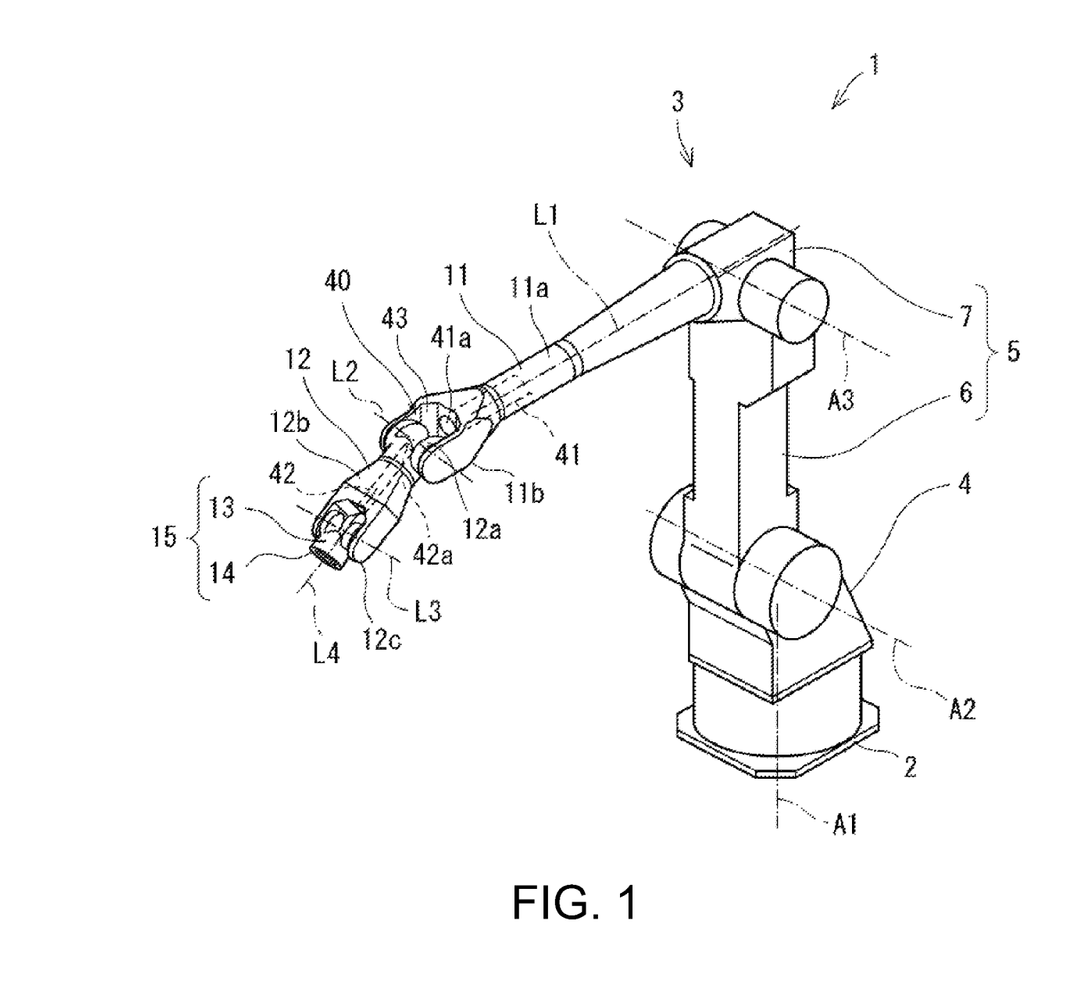
FIG. 1 is a perspective view of a robot device according to one embodiment.

FIG. 1 illustrates a robot device 1 according to this embodiment. The robot device 1 includes a pedestal 2 and an articulated robotic arm 3. The pedestal 2 is fixed on a horizontal installation surface, for example. The robotic arm 3 includes a swivel base 4, an arm 5, a first link 11, a second link 12, and a hand part 15.

The swivel base 4 is supported by the pedestal 2 so as to be rotatable on a swivel axis A1. The arm 5 is supported by the swivel base 4 at a base-end part, and rotatably supports the first link 11 at a tip-end part. The arm 5 includes a lower arm 6 and an upper arm 7. A base-end part of the lower arm 6 is supported by the swivel base 4 so as to be swingable on a lower arm axis A2. The upper arm 7 is supported by a tip-end part of the lower arm 6 so as to be swingable on an upper arm axis A3.

A base-end part of the first link 11 is supported by the tip-end part of the arm 5 (the upper arm 7). The first link 11 rotates on a first axis L1. The second link 12 is supported by a tip-end part of the first link 11 so as to be rotatable on a second axis L2. The hand part 15 is supported by a tip-end part of the second link 12. An end effector 80 (see FIG. 6) is detachably attached to a tip-end part of the hand part 15. The hand part 15 includes a third link 13 and a fourth link 14. The third link 13 is supported by the second link 12 so as to be rotatable on a third axis L3. The fourth link 14 is supported by the third link 13 so as to be rotatable on a fourth axis L4. The end effector 80 is attached to the fourth link 14, and it is rotatable with the fourth link 14 on the fourth axis L4 with respect to the third link 13.

When the pedestal 2 is installed horizontally, the swivel axis A1 is oriented vertically and the upper and lower arm axes A2 and A3 are oriented horizontally. The upper and lower arm axes A2 and A3 are parallel to each other. The first axis L1 is coaxial with the center axis of the first link 11. The second axis L2 is located in a twisted position to the first axis L1. The second axis L2 extends in parallel with a direction perpendicular to the first axis L1, does not intersect with the first axis L1, and is deviated from the first axis L1. The layout of the second axis L2 will be described later (see FIGS. 3-5). The third axis L3 is parallel to the second axis L2. The third axis L3 and the fourth axis L4 are perpendicular to each other.

The robotic arm 3 has a plurality of link members, a plurality of joints each of which couples the adjacent link members to each other rotatably on the corresponding rotation axis, and a plurality of joint actuators corresponding to the joints. Each joint actuator includes a servo driver, a servomotor, a rotation angle detector, and a speed reducer. Each servomotor rotates the corresponding link member on the corresponding rotation axis.

In this embodiment, the robot device 1 has seven link members 4, 6, 7, and 11-14, and seven joints. Seven rotation axes A1-A3 and L1-L4 correspond to the seven joints, and seven servomotors are provided corresponding to the seven joints. Rotation of each servomotor is servo-controlled by a control device 50 (see FIG. 2). The rotation angle about the seven rotation axes A1-A3 and L1-L4 (that is, postures of the seven link members 4, 6, 7, and 11-14) can be controlled independently from each other.

Figure 2:
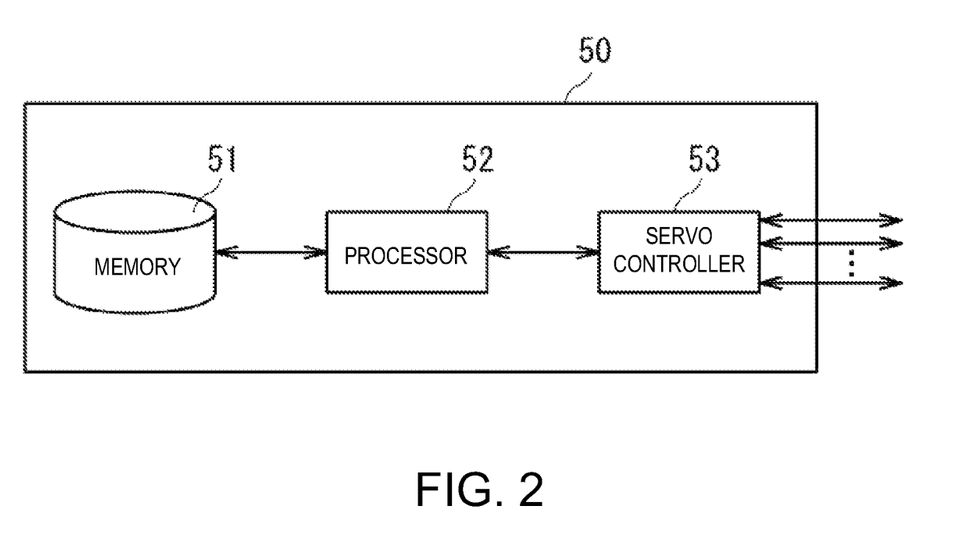
FIG. 2 is a block diagram illustrating a control device according to this embodiment.

As illustrated in FIG. 2, the control device 50 includes a memory 51 such as a ROM and/or a RAM, a processor 52 such as a CPU, and a servo controller 53. The control device 50 is a robot controller provided with a computer, such as a microcontroller, for example. The control device 50 may be comprised of a sole control device 50 which carries out a centralized control, or may be comprised of a plurality of control devices 50 which collaboratively carry out a distributed control.

The memory 51 stores a basic program as a robot controller, and information such as various fixed data. The processor 52 controls various operations of the robot device 1 by reading and executing software, such as the basic program stored in the memory 51. For example, the control device 50 controls operation of the robotic arm 3 based on the program stored in the memory 51 in advance or manipulation inputted by a worker. That is, the processor 52 generates a control command for the robot device 1 and outputs it to the servo controller 53. The servo controller 53 controls the drive of the servomotor corresponding to each joint of the robotic arm 3 based on the control command generated by the processor 52.

Figure 3:
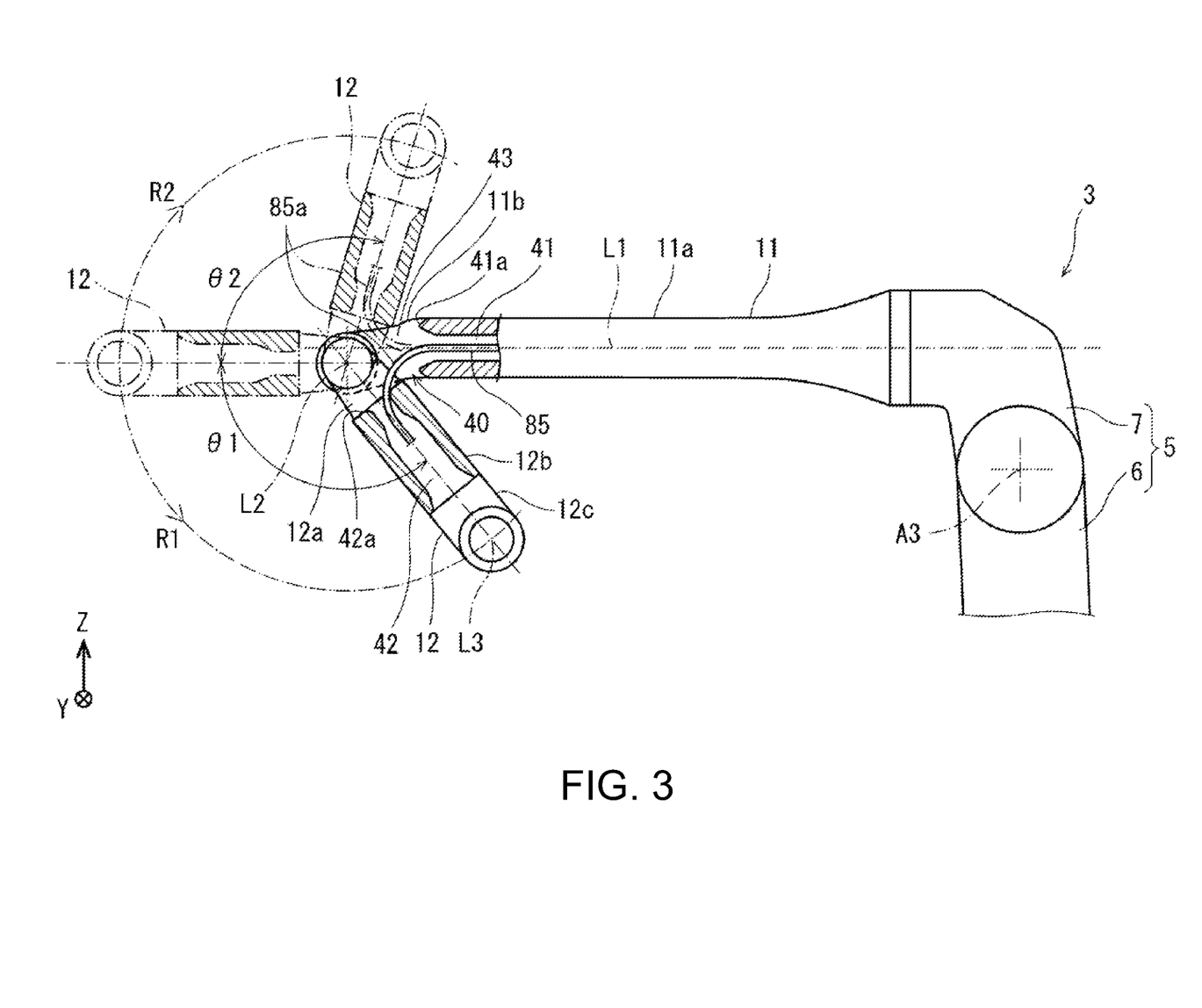
FIG. 3 is a side view of a first link and a second link according to this embodiment, where a reference posture of the second link, a state where the second link is rotated in a first rotating direction to a movable range limit, and a state where the second link is rotated in a second rotating direction to the movable range limit are illustrated.
Figure 4:
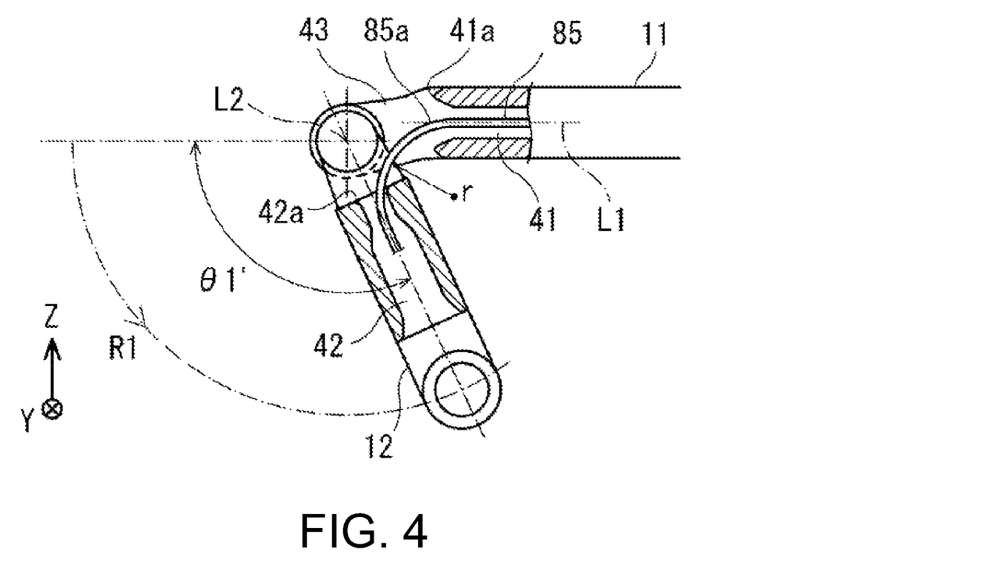
FIG. 4 is a side view of the first link and the second link according to this embodiment, where a state where the second link is rotated in the first rotating direction by the same rotation angle as a movable range limit of a comparative example is illustrated.

FIGS. 3 and 4 illustrate the first link 11 and the second link 12 according to this embodiment. Referring to FIGS. 1, 3, and 4, a line space 40 where a supply line 85 for supplying electricity and/or material is disposed is provided to the first link 11 and the second link 12. The supply line 85 may be a cable for supplying electricity, a hose for supplying material, or an integrated line which bundles the cable and the hose. The cable supplies electric power to the servomotor (particularly, what drives the hand part 15), or the end effector 80 (see FIG. 6). The hose supplies to the end effector 80 the material required for the work performed by the robot device 1. The material may be a welding wire required for a welding work, or paint required for a painting work.

The line space 40 includes a first insertion hole 41, a second insertion hole 42, and a gap space 43. The first insertion hole 41 is formed in a central part of the first link 11, and it opens in the tip-end part of the first link 11. The second insertion hole 42 is formed in a central part of the second link 12, and it opens in a base-end part of the second link 12. The gap space 43 is formed between a tip-end opening 41a of the first insertion hole 41 and a base-end opening 42a of the second insertion hole 42.

As one example of the structure of the first link 11 and the second link 12, the first link 11 has a cylindrical part 11a and a forked part 11b. The cylindrical part 11a has a length as long as the lower arm 6, and a base-end part of the cylindrical part 11a is supported by the arm 5 (the upper arm 7). The first axis L1 is coaxial with the center axis of the cylindrical part 11a. The forked part 11b is formed in a tip-end part of the cylindrical part 11a, and constitutes the tip-end part of the first link 11. The second link 12 has a base-end forked part 12a, a cylindrical part 12b, and a tip-end forked part 12c. The cylindrical part 12b is shorter than the cylindrical part 11a. The base-end forked part 12a constitutes the base-end part of the second link 12, and the tip-end forked part 12c constitutes the tip-end part of the second link 12. The second link 12 is supported at both ends by the forked part 11b in a state where a pair of outer surfaces of the base-end forked part 12a contact a pair of inner surfaces of the forked part 11b, respectively. A tip-end face of the cylindrical part 11a which is the root part of the forked part 11b is separated from a base-end face of the cylindrical part 12b which is the root part of the base-end forked part 12a. Note that the tip-end forked part 12c rotatably supports the third link 13 at both ends.

The first insertion hole 41 extends inside the cylindrical part 11a along the center axis of the cylindrical part 11a (that is, the first axis L1). The tip-end opening 41a of the first insertion hole 41 opens in the tip-end face of the cylindrical part 11a (the root part of the forked part 11b). The second insertion hole 42 extends inside the cylindrical part 12b along the center axis of the cylindrical part 12b. The base-end opening 42a of the second insertion hole 42 opens in the base-end face of the cylindrical part 12b (the root part of the base-end forked part 12a). The gap space 43 is formed between the cylindrical parts 11a and 12b, and is formed between the base-end forked part 12a. The tip-end opening 41a and the base-end opening 42a open in the gap space 43. The center of the tip-end opening 41a is on the center axis of the cylindrical part 11a (the first axis L1). The center of the base-end opening 42a is on the center axis of the cylindrical part 12b.

The supply line 85 is disposed inside the first insertion hole 41, and is disposed inside the second insertion hole 42 through the tip-end opening 41a, the gap space 43, and the base-end opening 42a. When the second link 12 rotates, the position or posture of the base-end opening 42a with respect to the tip-end opening 41a changes about the second axis L2. Inside the gap space 43, the supply line 85 is bent so as to follow the posture of the second link 12. Below, a part of the supply lines 85 inside the gap space 43 is referred to as a "bendable part 85a."

Figure 5:
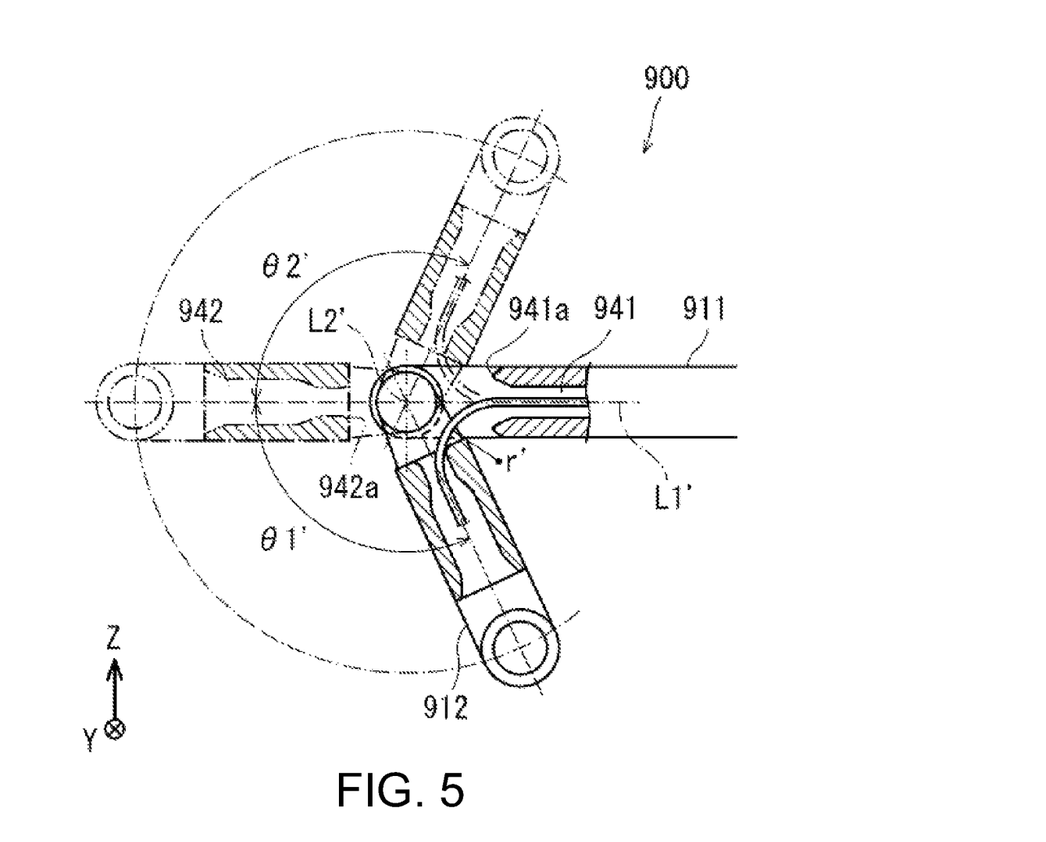
FIG. 5 is a side view of a first link and a second link according to the comparative example.

FIG. 5 illustrates a first link 911 and a second link 912 according to a comparative example. This embodiment and the comparative example are the same in the structure of the first link and the second link, but are different in the layout of the second axis with respect to the first axis. Below, a state where the second link extends in parallel to the first axis is referred to as "a reference posture of the second link." In the illustrated example, the first axis is horizontal, and the second link also extends horizontally in the reference posture. Below, one direction perpendicular to the first axis is referred to as a "first perpendicular direction Y," and a direction perpendicular to both the first axis and the first perpendicular direction Y is referred to as a "second perpendicular direction Z." In the illustrated example, the first axis is oriented in the left-and-right direction of the drawing sheet. The first perpendicular direction Y corresponds to a direction perpendicular to the drawing sheet, and is horizontal. The second perpendicular direction Z corresponds to the up-and-down direction of the drawing sheet, and is vertical.

In a robot device 900 according to the comparative example, a second axis L2' is perpendicular to a first axis L1'. The second axis L2' is oriented in the first perpendicular direction Y, and intersects with the first axis L1'. When the second link 912 is rotated downwardly from the reference posture on the second axis L2', the second link 912 can be rotated to a first limit angle θ1'. When the second link 912 is rotated upwardly from the reference posture on the second axis L2', the second link 912 can be rotated to a second limit angle θ2'. The first limit angle θ1' and the second limit angle θ2' have substantially the same value.

The center axis of the second link 912 passes through an intersection between the first axis L1' and the second axis L2'. When the second link 912 is in the reference posture, not only the center of a tip-end opening 941a of a first insertion hole 941 but the center of a base-end opening 942a of a second insertion hole 942 is also located on the first axis L1'.

Referring to FIG. 3, in this embodiment, the second axis L2 extends in parallel with the first perpendicular direction Y, and is deviated in the second perpendicular direction Z from the first axis L1. In the illustrated example, the second axis L2 is located below the first axis L1. Below, a rotating direction when the second link 12 rotates from the reference posture so that a tip end of the second link 12 is oriented to the deviating side of the second axis L2 (downwardly in the illustrated example) is referred to as a "first rotating direction R1." A rotating direction when the second link 12 rotates from the reference posture so that the tip end of the second link 12 is oriented to the opposite side (upwardly in the illustrated example) from the deviating side of the second axis L2 is referred to as a "second rotating direction R2."

In this embodiment, when the second link 12 rotates in the first rotating direction R1, the second link 12 can rotate from the reference posture to a first limit angle θ1, without the second link 12 interfering with the first link 11. Since the second axis L2 is deviated, the first limit angle θ1 becomes larger than the first limit angle θ1' of the comparative example. That is, the movable range of the second link 12 in the first rotating direction R1 increases. Accompanying with this, the movable ranges of the hand part 15 and the end effector 80 provided to the tip-end part of the second link 12 also increase. When the second link 12 rotates in the second rotating direction R2, the second link 12 can rotate from the reference posture to a second limit angle θ2. The first limit angle θ1 is larger than the second limit angle θ2.

Note that an amount of deviation of the second axis L2 from the first axis L1 (a distance in the second perpendicular direction Z) is set as a distance which exceeds a range of manufacturing error. The amount of deviation is 20 mm to 50 mm, for example. The second axis L2 does not intersect with the first axis L1 within the range of manufacturing error (e.g., about 1 mm).

As a result of this axial layout, in the reference posture of the second link 12, the center axis of the second link 12 separates from the first axis L1 and extends in parallel with the first axis L1. Therefore, the center of the base-end opening 42a of the second insertion hole 42 is deviated in the second perpendicular direction Z from the center of the tip-end opening 41a of the first insertion hole 41. An amount of deviation of the opening is equivalent to the amount of deviation of the axis.

FIG. 4 illustrates a state where the second link 12 rotates in the first rotating direction R1 from the reference posture by the first limit angle θ1' of the comparative example. When the second link 12 rotates from the reference posture by the same rotation angle, the distance from the center of the tip-end opening 41a to the base-end opening 42a becomes longer than that of the comparative example. Therefore, a curvature r of the bendable part 85a becomes smaller than a curvature r' in the comparative example. When the second link 12 rotates in the first rotating direction R1 from the reference posture, the curvature of the bendable part 85a is eased and the protection of the supply line 85 increases.

Figure 6:
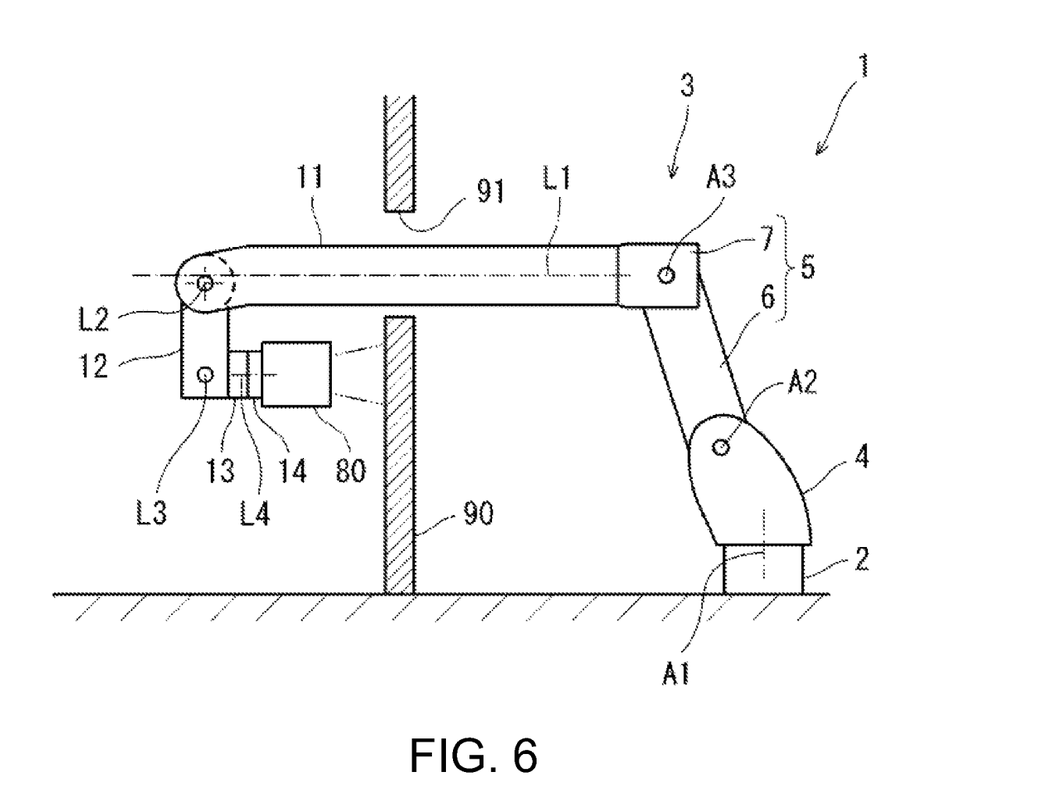
FIG. 6 is a view illustrating one example of a work performed using the robot device according to this embodiment.

FIG. 6 illustrates one example of a work performed using the robot device 1. Here, a spray gun for painting is adopted as the end effector 80, and a work in which the workpiece 90 is painted by the spray gun is illustrated. The spray gun injects paint which is supplied through the supply line 85 (see FIGS. 3 and 4). The workpiece 90 has an opening 91. The pedestal 2 is installed outside the workpiece 90. A part to be painted is an inner surface of the workpiece 90, and it is located below the opening 91.

Upon the painting work, the control device 50 controls the servomotors corresponding to the upper and lower arm axes A2 and A3 so that the first link 11 becomes in the posture extending substantially horizontally. The first link 11 is inserted into the opening 91, and the tip-end part of the first link 11 is positioned inside the workpiece 90. The control device 50 drives the servomotor corresponding to the second axis L2 so that the second link 12 extends substantially vertically and becomes in a posture where it is bent downwardly with respect to the first link 11. The control device 50 controls the servomotor corresponding to the third axis L3 so that the hand part 15 extends substantially horizontally and becomes in a posture where it is bent with respect to the second link 12. As a result, a part from the swivel base 4 to the first link 11 takes a posture of a relatively large inverted L-shape. Inside the workpiece 90, the second link 12 and the hand part 15 take a posture of a relatively small L-shape. Therefore, the end effector 80 can oppose to the inner surface of the workpiece 90 below the opening 91, and can inject the paint to the part to be painted.

The control device 50 controls the servomotor corresponding to the first axis L1 so that the second perpendicular direction Z is oriented vertically and the second axis L2 is deviated below the first axis L1. Therefore, when performing the painting work below the opening 91, the movable range of the second link 12 (as a result, the end effector 80) increases and the workability improves. Moreover, the curvature of the bendable part 85a of the supply line 85 is eased, and the supply line 85 can be protected.

Note that it is similar when performing the work above the opening 91. The control device 50 controls the servomotor corresponding to the first axis L1 so that the second axis L2 becomes a posture where it is deviated above the first axis L1.

The embodiment described above is one example. Modification, addition, and/or deletion may suitably be possible for the configuration described above within the scope of the present disclosure.

The invention claimed is:

1. A robot device, comprising:
   a first link configured to rotate on a first axis, the first link including a tip-end part and a portion that extends from a base end of the first link to the tip-end part of the first link;
   a second link supported by the tip-end part of the first link so as to be rotatable on a second axis; and
   a hand part supported by a tip-end part of the second link, wherein
   one direction perpendicular to the first axis is a first perpendicular direction, and a direction perpendicular to both the first axis and the first perpendicular direction is a second perpendicular direction, the second axis extends in parallel to the first perpendicular direction and is deviated from the first axis in the second perpendicular direction,
   the tip-end part of the first link is bent away from the first axis so that the second link can rotate relative to the first link farther in a first direction around the second axis from a reference position than in an opposite direction around the second axis from the reference position, and
   in the reference position, a length of the second link is parallel to a length of the portion, a central axis of the second link extends through a body of the portion, and the first axis extends through a body of the second link.

2. The robot device of claim 1, wherein the first link and the second link include a line space, and
   a supply line configured to supply electricity and/or material is in the line space,
   the line space includes:
   a first insertion hole in a central part of the first link and opening in the tip-end part of the first link;
   a second insertion hole in a central part of the second link and opening in a base-end part of the second link; and
   a gap space between a tip-end opening of the first insertion hole and a base-end opening of the second insertion hole, and
   in a reference posture of the second link, the center of the base-end opening of the second insertion hole is deviated in the second perpendicular direction from the center of the tip-end opening of the first insertion hole.

3. The robot device of claim 1, wherein the hand part includes:
   a third link supported by the tip-end part of the second link so as to be rotatable on a third axis parallel to the second axis; and
   a fourth link supported by the third link so as to be rotatable on a fourth axis perpendicular to the third axis.

4. The robot device of claim 1, comprising:
   a pedestal;
   a swivel base supported by the pedestal so as to be rotatable on a swivel axis; and
   an arm supported at a base-end part by the swivel base and supporting at the tip-end part the first link so as to be rotatable on the first axis.

5. The robot device of claim 1, comprising a plurality of servomotors corresponding to joints.

6. The robot device of claim 2, wherein the hand part includes:
   a third link supported by the tip-end part of the second link so as to be rotatable on a third axis parallel to the second axis; and a fourth link supported by the third link so as to be rotatable on a fourth axis perpendicular to the third axis.

7. The robot device of claim 2, comprising:
a pedestal;
a swivel base supported by the pedestal so as to be rotatable on a swivel axis; and
an arm supported at a base-end part by the swivel base and supporting at the tip-end part the first link so as to be rotatable on the first axis.

8. The robot device of claim 3, comprising:
a pedestal;
a swivel base supported by the pedestal so as to be rotatable on a swivel axis; and
an arm supported at a base-end part by the swivel base and supporting at the tip-end part the first link so as to be rotatable on the first axis.

9. The robot device of claim 6, comprising:
a pedestal;
a swivel base supported by the pedestal so as to be rotatable on a swivel axis; and
an arm supported at a base-end part by the swivel base and supporting at the tip-end part the first link so as to be rotatable on the first axis.

10. The robot device of claim 2, comprising a plurality of servomotors corresponding to joints.

11. The robot device of claim 3, comprising a plurality of servomotors corresponding to joints.

12. The robot device of claim 4, comprising a plurality of servomotors corresponding to joints.

13. The robot device of claim 6, comprising a plurality of servomotors corresponding to joints.

14. The robot device of claim 7, comprising a plurality of servomotors corresponding to joints.

15. The robot device of claim 8, comprising a plurality of servomotors corresponding to joints.

16. The robot device of claim 9, comprising a plurality of servomotors corresponding to joints.

17. The robot device of claim 1, wherein an axial length of the tip-end part is less than an axial length of the portion.

* * * * *